US011826735B2

(12) United States Patent
Diehl et al.

(10) Patent No.: US 11,826,735 B2
(45) Date of Patent: Nov. 28, 2023

(54) MULTI-METALLIC CATALYST DOPED WITH PHOSPHORUS AND YTTRIUM

(71) Applicant: IFP Energies Nouvelles, Rueil-Malmaison (FR)

(72) Inventors: Fabrice Diehl, Lyons (FR); Carine Guegan, Lyons (FR)

(73) Assignee: IFP Energies Nouvelles, Rueil Malmaison (FR)

( * ) Notice: Subject to any disclaimer, the term of this patent is extended or adjusted under 35 U.S.C. 154(b) by 0 days.

(21) Appl. No.: 17/674,407

(22) Filed: Feb. 17, 2022

(65) Prior Publication Data
US 2022/0168713 A1 Jun. 2, 2022

Related U.S. Application Data

(63) Continuation of application No. 16/768,138, filed as application No. PCT/EP2018/081578 on Nov. 16, 2018, now Pat. No. 11,285,464.

(30) Foreign Application Priority Data

Nov. 30, 2017 (FR) ........................ 1761408

(51) Int. Cl.
*B01J 27/18* (2006.01)
*B01J 27/185* (2006.01)
*B01J 23/63* (2006.01)
*B01J 37/02* (2006.01)
*B01J 37/08* (2006.01)
*B01J 37/18* (2006.01)
*C10G 35/085* (2006.01)

(52) U.S. Cl.
CPC ........... *B01J 27/1856* (2013.01); *B01J 23/63* (2013.01); *B01J 27/1813* (2013.01); *B01J 37/0207* (2013.01); *B01J 37/0236* (2013.01); *B01J 37/088* (2013.01); *B01J 37/18* (2013.01); *C10G 35/085* (2013.01); *C10G 2300/1044* (2013.01); *C10G 2300/305* (2013.01); *C10G 2300/308* (2013.01)

(58) Field of Classification Search
CPC . B01J 21/04; B01J 23/626; B01J 23/63; B01J 27/1813; B01J 27/1856; B01J 37/0207; B01J 37/0236; B01J 37/088; B01J 37/18; B01J 2523/00; C10G 35/085; C10G 35/09; C10G 2300/1044; C10G 2300/305; C10G 2300/308
See application file for complete search history.

(56) References Cited

U.S. PATENT DOCUMENTS

| | | | |
|---|---|---|---|
| 4,039,477 A | 8/1977 | Engelhard et al. | |
| 4,227,993 A | 10/1980 | Engelhard et al. | |
| 4,444,905 A | 4/1984 | Pessimisis | |
| 5,254,518 A | 10/1993 | Soled et al. | |
| 7,410,565 B1 | 8/2008 | Lapinski et al. | |
| 10,471,414 B2 | 11/2019 | Avenier et al. | |
| 2005/0121364 A1 | 6/2005 | Tanev | |
| 2012/0125814 A1 | 5/2012 | Sanchez et al. | |
| 2016/0051969 A1 | 2/2016 | Zhang et al. | |
| 2019/0015819 A1 | 1/2019 | Avenier et al. | |

FOREIGN PATENT DOCUMENTS

| | | |
|---|---|---|
| FR | 2280426 A1 | 2/1976 |
| FR | 3039082 A1 | 1/2017 |
| GB | 2055602 B | 7/1983 |

OTHER PUBLICATIONS

International Search Report dated Dec. 14, 2018 issued in corresponding PCT/EP2018/081578 application (2 pages).

*Primary Examiner* — Brian A Mccaig
(74) *Attorney, Agent, or Firm* — MILLEN, WHITE, ZELANO & BRANIGAN, PC; Ryan Pool

(57) ABSTRACT

The invention relates to a catalyst comprising a support, at least one noble metal M, tin, phosphorus and yttrium, the content of phosphorus element being less than or equal to 1% by weight, and the content of yttrium being less than or equal to 1% by weight relative to the mass of the catalyst. The invention also relates to the process for preparing the catalyst and to the use thereof in reforming.

18 Claims, No Drawings

MULTI-METALLIC CATALYST DOPED WITH PHOSPHORUS AND YTTRIUM

The present invention relates to the field of hydrocarbon conversion and more specifically to the reforming of hydrocarbon-based feedstocks in the presence of a catalyst to produce gasoline cuts and aromatic compounds. More particularly, the invention relates to an improved catalyst based on at least one noble metal, tin, phosphorus and yttrium, to the process for preparing same and to the use thereof in a reforming process.

Catalytic reforming processes make it possible to significantly increase the octane number of gasoline fractions originating from the direct distillation of crude oil and/or from other refining processes, for instance catalytic cracking or thermal cracking. The process of catalytic reforming is a process that is very widely used by refiners in order to upgrade the heavy gasoline obtained by distillation. The hydrocarbons of the heavy gasoline feedstock (notably paraffins and naphthenes) containing from 5 to 12 carbon atoms approximately per molecule are converted during this process into aromatic hydrocarbons and branched paraffins. This conversion is obtained at high temperature (on average in the range 480 to 520° C.), at low to medium pressure (0.2 to 2.5 MPa) and in the presence of a catalyst. Catalytic reforming produces reformate which makes it possible to significantly improve the octane number of petroleum cuts, and hydrogen. Reformate is predominantly formed of C5+ compounds (compounds containing at least 5 carbon atoms).

Reforming catalysts are multi-metal catalysts. There are two major categories of reforming catalysts, which have different properties: platinum-tin catalysts generally used in the form of beads in a moving-bed reactor in CCR (continuous catalytic reforming) processes, and platinum-rhenium catalysts generally used in extruded form in fixed beds.

For these two types of catalysts, numerous patents describe the addition of promoters in order to improve their performance with regard to the reforming of hydrocarbon-based feedstocks.

As regards doping with lanthanides, and notably cerium, U.S. Pat. No. 2,814,599 describes the addition of promoters such as gallium, indium, scandium, yttrium, lanthanum, thallium or actinium, to catalysts based on platinum or palladium. US 2013/0015103 describes catalysts with Ce (PtSnCe). US 2013/0256194 describes this same type of catalyst in combination with alkaline compounds in very low content. EP 1390140 describes catalysts doped with Ce and/or Eu. CN103372454 and U.S. Pat. No. 6,239,063 describe catalysts including other lanthanides in addition to Ce on the same catalyst. CN105771981 claims the combined use of Ce and Y on the same catalyst of PtSn type.

Phosphorus is moreover known for increasing the yields of hydrocarbon-based compounds strictly containing more than 4 carbon atoms (C5+) and in particular of aromatic products. This property is claimed in U.S. Pat. Nos. 2,890, 167, 3,706,815, 4,367,137, 4,416,804, 4,426,279 and 4,463, 104.

US 2012/122665 describes a catalyst comprising platinum, tin, phosphorus and at least one promoter selected from the group consisting of gallium, indium, thallium, arsenic, antimony and bismuth.

EP1656991 describes a catalyst comprising platinum and tin with a Pt/Sn ratio of less than 0.9, and optionally another element chosen from germanium, gallium, cerium, lanthanum, europium, indium, phosphorus, nickel, iron, tungsten, molybdenum, zinc and cadmium, alone or as a mixture in an elemental content of between 0.1% and 10% by weight relative to the mass of the catalyst, without, however, linking any particular effect to the promoters.

It has also been described in US 2007/0215523 that the addition of dilute amounts of phosphorus, less than 0.4% by weight, stabilizes the support by allowing better specific surface area retention and chlorine retention during its use in catalytic reforming processes. Said document discloses a catalyst based on platinum and phosphorus optionally comprising another element chosen from tin, rhenium, germanium, lead, indium, gallium, iridium, lanthanum, cerium, boron, cobalt, nickel and iron, alone or as a mixture in an elemental content of between 0.01% and 5% by weight relative to the mass of the catalyst.

In this context, one of the objects of the present invention is to propose a catalyst which has improved selectivity and stability in a reforming process without deteriorating the activity.

The term "selectivity" means the yield of C5+ compounds expressed as a mass percentage relative to the effluent at a given level of activity (typically at a given octane number level).

The activity is generally characterized as the given octane number of the C5+ compounds at a level of severity or is expressed, conversely, by a temperature required to reach a given octane number (also known as the RON or Research Octane Number).

The term "stability" means the stability of the activity which is generally measured by the thermal increment applied during functioning in the unit per unit of time or of feedstock to maintain the performance at a given octane number.

The invention relates to a catalyst comprising a support, at least one noble metal M, tin, phosphorus and yttrium, the content of phosphorus element being less than or equal to 1% by weight, and the content of yttrium being less than or equal to 1% by weight relative to the mass of the catalyst.

It has been shown that the simultaneous presence of a phosphorus promoter and of an yttrium promoter, each promoter being present in a certain amount on a catalyst based on a noble metal and tin, gives the final catalyst selectivity and stability that are far superior to those of the prior art catalysts containing only one of these promoters. Without being bound to any theory, it appears that the simultaneous presence of an amount of a phosphorus promoter of less than or equal to 1% by weight, preferably between 0.3% and 1% by weight and even more preferably between 0.4% and 0.8% and of an amount of an yttrium promoter of less than or equal to 1% by weight, preferably between 0.01% and 0.5% by weight relative to the mass of the catalyst, shows, surprisingly, a synergistic effect on improving the selectivity and the stability without this synergistic effect being foreseeable by the simple addition of the known improving effects of the promoters.

According to one variant, the content of noble metal M is between 0.02% and 2% by weight relative to the mass of the catalyst.

According to one variant, the metal M is platinum or palladium.

According to one variant, the content of tin element is between 0.005% and 10% by weight relative to the mass of the catalyst.

According to one variant, the yttrium content is between 0.01% and 0.5% by weight relative to the mass of the catalyst.

According to one variant, the phosphorus content is between 0.3% and 1% by weight relative to the mass of the catalyst.

According to one variant, the Sn/M atomic ratio is between 0.5 and 4.0, the P/M ratio is between 0.2 and 30.0 and the Y/M ratio is between 0.1 and 5.0.

According to one variant, the support comprises silica, alumina or silica-alumina.

According to one variant, the catalyst also contains a halogenated compound.

According to this variant, the content of halogenated compound is between 0.1% and 8% by weight relative to the mass of the catalyst.

The invention also relates to a process for preparing a catalyst according to the invention, comprising the following successive steps:
- a) a precursor comprising a support, tin, phosphorus and a noble metal is prepared,
- b) the precursor obtained in step a) is dried under a stream of a neutral gas or under a stream of a gas containing oxygen at a temperature below 200° C., and is calcined at a temperature between 350 and 650° C.,
- c) the dried and calcined precursor obtained in step b) is impregnated with an impregnation solution comprising an yttrium precursor,
- d) the impregnated precursor obtained in step c) is dried under a stream of a neutral gas or under a stream of a gas containing oxygen at a temperature below 200° C., and is calcined at a temperature between 350 and 650° C.

According to one variant, step a) comprises the following steps:
- a1) a support comprising tin is prepared by introducing a tin precursor during the forming of the support,
- a2) the support containing tin obtained in step a1) is impregnated with an impregnation solution comprising at least one noble metal precursor and a phosphorus precursor.

According to another variant, step a) comprises the following steps:
- a1') a support comprising tin and phosphorus is prepared by introducing a tin precursor and a phosphorus precursor during the forming of the support,
- a2') the support containing tin and phosphorus obtained in step a1') is impregnated with an impregnation solution comprising at least one noble metal precursor.

According to another variant, the catalyst obtained after step d) is subjected to a treatment under hydrogen.

The invention also relates to the use of the catalyst according to the invention in a reforming process.

Hereinbelow, the groups of chemical elements are given according to the CAS classification (CRC Handbook of Chemistry and Physics, published by CRC Press, Editor in Chief D. R. Lide, 81$^{st}$ edition, 2000-2001). For example, Group VIII according to the CAS classification corresponds to the metals of columns 8, 9 and 10 according to the new IUPAC classification.

All the contents of the various components of the catalyst, and notably the contents of noble metal, tin, phosphorus, yttrium and halogenated compound, are expressed relative to the element, unless explicitly indicated otherwise.

DETAILED DESCRIPTION OF THE INVENTION

Catalyst

The invention relates to a catalyst comprising a support, at least one noble metal M, tin, phosphorus and yttrium, the content of phosphorus element being less than or equal to 1% by weight, and the content of yttrium being less than or equal to 1% by weight relative to the mass of the catalyst.

The support generally comprises at least one oxide selected from the group consisting of magnesium, titanium, zirconium, aluminium and silicon oxides. Preferably, the support comprises silica, alumina or silica-alumina, and very preferably alumina. Preferably, the support comprises alumina, and very preferably the alumina is gamma-alumina.

The support advantageously has a total pore volume of between 0.1 and 1.5 cm$^3$/g, more preferably between 0.4 and 0.8 cm$^3$/g. The total pore volume is measured by mercury porosimetry according to the standard ASTM D4284 with a wetting angle of 140°, as described in the book by Rouquerol F.; Rouquerol J.; Singh K., "Adsorption by Powders & Porous Solids: Principle, Methodology and Applications", Academic Press, 1999, for example by means of a Micromeritics™ brand Autopore III™ model machine.

The specific surface area of the support is advantageously between 50 and 600 m$^2 \cdot$g$^{-1}$, preferably between 100 and 400 m$^2 \cdot$g$^{-1}$ and more preferably between 150 and 300 m$^2 \cdot$g$^{-1}$. The specific surface area is determined in the present invention by the BET method according to the standard ASTM D3663, method described in the same book cited above.

Advantageously, the support has a tapped packing density (TPD) value of between 0.4 and 0.8 g/mL, preferably between 0.5 and 0.7 g/mL. The TPD measurement consists in introducing the support into a measuring cylinder (typically with a volume of 100 mL), the volume of which has been determined beforehand, and then, by vibration, in tapping it until a constant volume is obtained. The bulk density of the tapped product is calculated by comparing the mass introduced and the volume occupied after tapping. The measurement uncertainty is generally of the order of ±0.01 g/mL.

Thus, when the support is used as a reforming catalyst support, it is able to meet the requirements of a "dense" support (e.g. tapped packing density of about 0.6 to 0.7 g/mL) and also the requirements of a "light" support (e.g. tapped packing density of about 0.5 to 0.6 g/mL).

Preferably, the tapped packing density (TPD) value of said support is between 0.5 and 0.7 g/mL.

The support is advantageously in the form of beads, extrudates, pellets or powder. Preferably, the support is in the form of beads. The support may be obtained via any technique known to those skilled in the art. The forming may be performed, for example, by extrusion, by pelletizing, by the drop coagulation (oil drop) method, by granulation on a rotating plate or via any other method that is well known to those skilled in the art.

When the support is in the form of beads, its diameter is generally between 0.5 and 5 mm. Such a bead may be manufactured via the oil-drop method. According to this method and when the support is an alumina, a suspension containing an alumina gel (such as boehmite (crystalline aluminium oxyhydroxide) or pseudoboehmite), an emulsifier, optionally metal precursors and water is prepared and the suspension is transferred into a dropping pot equipped with nozzles whose orifices are calibrated to form droplets. The suspension is then dripped by gravity into a column containing an organic phase in the upper part (petroleum phase) and a basic aqueous phase (ammoniacal solution) in the lower part, so as to collect the spheroidal particles at the bottom of the basic aqueous phase. It is during the passage of the droplet through the organic phase that the forming of the spheres takes place, whereas gelation (or coagulation) takes place in the aqueous phase. The beads are then dried and calcined. When the support is in the form of extrudates, they may be prepared by blending an alumina gel with water and suitable peptizers, such as hydrochloric acid or nitric acid, in the optional presence of metal precursors, until an extrudable paste is formed (shearing acidic blending). The paste obtained may be extruded through a die of suitable size to form extrudates which are subsequently dried and then calcined. Prior to extrusion, it may sometimes be necessary to add a pH neutralizer such as an ammoniacal solution. In general, the diameter of the extrudates is between 0.5 and 5 mm, preferably with a length-to-diameter ratio of from 1:1 to 5:1.

An essential component of the catalyst according to the invention is a noble metal M, preferably platinum or palladium, very preferably platinum. This noble metal may exist in the final catalyst as oxide, sulfide, halide or oxyhalide compound in chemical combination with one or more of the other components of the catalyst or in the form of elemental metal.

The content of noble metal M in the catalyst according to the invention is between 0.02% and 2% by weight, preferably between 0.05% and 1.5% by weight and even more preferably between 0.1% and 0.8% by weight relative to the mass of the catalyst.

Another essential component of the catalyst according to the invention is tin. This element may exist in the final catalyst as oxide, sulfide, halide or oxyhalide compound in chemical combination with one or more of the other components of the catalyst or in the form of elemental metal.

The tin content in the catalyst according to the invention is between 0.005% and 10% by weight, more preferably between 0.01% and 5% by weight and very preferably between 0.1% and 1% by weight.

Another essential component of the catalyst according to the invention is phosphorus. This element may exist in the final catalyst as oxide or mixed oxide, phosphate, polyphosphate, sulfide, halide, oxyhalide or hydride compound or in chemical combination with one or more of the other components of the catalyst.

The content of phosphorus element in the catalyst according to the invention is less than or equal to 1% by weight, preferably between 0.3% and 1% by weight and particularly preferably between 0.4% and 0.8% by weight. Preferably, the phosphorus is added by impregnation.

Another essential component of the catalyst according to the invention is yttrium. Yttrium may exist in the final catalyst as oxide, sulfide, halide or oxyhalide compound in chemical combination with one or more of the other components of the catalyst or in the form of elemental metal.

The content of yttrium element in the catalyst according to the invention is less than or equal to 1% by weight, preferably between 0.01% and 0.5% by weight and particularly preferably between 0.02% and 0.3% by weight relative to the mass of the catalyst. Preferably, the yttrium is added by impregnation.

The simultaneous presence of an amount of phosphorus of less than or equal to 1% by weight, and preferably between 0.3% and 1% by weight, and of an amount of yttrium of less than or equal to 1% by weight relative to the mass of the catalyst shows a surprising synergistic effect, notably for the essential functions of the catalyst, namely the selectivity and the stability, without deteriorating the activity.

The Sn/M atomic ratio is generally between 0.5 and 4.0, more preferably between 0.9 and 3.5 and very preferably between 0.95 and 3.2.

The P/M ratio is generally between 0.2 and 30.0, more preferably between 0.5 and 20.0 and very preferably between 0.9 and 15.0.

The Y/M ratio is generally between 0.1 and 5.0 and more preferably between 0.2 and 3.0.

The catalyst according to the invention may also preferably comprise a halogenated compound, selected from the group consisting of fluorine, chlorine, bromine and iodine. The content of halogenated compound is generally of between 0.1% and 8% by weight, preferably between 0.2% and 3% by weight of catalyst after calcination. Preferably, the halogenated compound is chlorine.

The catalyst according to the invention may optionally also include other promoters chosen from groups IA, IIA, IIIA (notably indium), IVA (notably germanium) and VA of the Periodic Table, cobalt, nickel, iron, tungsten, molybdenum, chromium, bismuth, antimony, zinc, cadmium and copper. When these elements are present in the catalyst, the content expressed as oxide is generally between 0.01% and 2% by weight, preferably between 0.05% and 1% by weight relative to the mass of the catalyst.

However, the catalyst preferably consists of a support, of at least one noble metal M, of tin, of phosphorus and of yttrium, and particularly preferably it consists of an alumina support, of platinum, of tin, of phosphorus and of yttrium in the specific amounts of phosphorus and yttrium indicated above.

All the elements are preferably uniformly distributed in the support.

Catalyst Preparation Process

The catalyst according to the invention may be prepared according to any preparation method known to those skilled in the art.

The noble metal may be incorporated into the support in any suitable manner, such as coprecipitation, ion exchange or impregnation. Preferably, it is introduced by impregnation of the preformed support, for example by impregnation in excess or dry impregnation (the volume of solution containing the element to be introduced corresponding to the pore volume of the support), and preferably by impregnation in excess. To do this, the support is impregnated with an impregnation solution comprising at least the noble metal.

In general, hydrogen chloride or another similar acid may also be added to the impregnation solution to further facilitate the incorporation or attachment to the surface of the support of the noble metal component and uniform distribution of the metal components throughout the support material.

In addition, it is generally preferable to impregnate the support after it has been calcined, so as to minimize the risk of leaching of the noble metal.

When the noble metal is platinum, the platinum precursors form part of the following group, without this list being limiting: hexachloroplatinic acid, bromoplatinic acid, ammonium chloroplatinate, platinum chlorides, dichlorocarbonylplatinum dichloride, tetraammineplatinum chloride or dihydroxydiammineplatinum. Organoplatinum complexes, such as platinum(II) diacetylacetonate, may also be used. Preferably, the precursor used is hexachloroplatinic acid.

The tin may be incorporated into the support in any suitable manner, such as coprecipitation, ion exchange or impregnation, and in any step of the process for preparing the catalyst.

According to a first variant, it may be introduced into the support, for example during the synthesis of the support or during the forming of the support. Without being exhaustive, techniques for addition before or during the dissolution of the oxide precursors of the support during the synthesis of the support, with or without maturation, may be suitable for use. The introduction may thus be simultaneous with or subsequent to the mixing of the precursors of the support. The tin may be introduced during the synthesis of the support according to any technique of sol-gel type or may be added to an alumina sol. The tin may also be introduced during the implementation of the support according to the prior art techniques of forming of the support, such as the forming procedures by extrusion or by oil drop.

According to a second variant, the tin may be introduced onto the support, for example by impregnation of the pre-formed support. Impregnation of the support with a solution containing one or more tin precursors may be performed with an excess of solution or by dry impregnation. The impregnation may be performed in the presence of species which act on the interaction between the tin precursor and the support. These species may be, for example, and without being limiting, mineral acids (HCl, $HNO_3$) or organic acids (such as carboxylic or polycarboxylic acids), and organic compounds of complexing type, as described, for example, in U.S. Pat. Nos. 6,872,300 and 6,291,394. Preferably, the impregnation is performed according to any technique known to those skilled in the art for obtaining uniform distribution of the tin in the catalyst.

The tin precursors may be mineral or of organometallic type, optionally of water-soluble organometallic type. The tin precursor may be chosen from the group formed by halogenated, hydroxide, carbonate, carboxylate, sulfate, tartrate and nitrate compounds. These tin forms may be introduced into the medium for preparing the catalyst in their form as supplied or generated in situ (for example by introduction of tin and carboxylic acid). The tin-based precursors of organometallic type may be, for example, $SnR_4$, in which R represents alkyl group, for example a butyl group, $Me_3SnCl$, $Me_2SnCl_2$, $Et_3SnCl$, $Et_2SnCl_2$, $EtSnCl_3$, $iPrSnCl_2$, the hydroxides $Me_3SnOH$, $Me_2Sn(OH)_2$, $Et_3SnOH$, $Et_2Sn(OH)_2$, the oxide $(Bu_3Sn)_2O$ or the acetate $Bu_3SnOC(O)Me$. Preferably, halogenated tin species, in particular chlorinated species, will be used. In particular, $SnCl_2$ or $SnCl_4$ will advantageously be used.

According to a third variant, the tin may also be introduced partly during the synthesis or forming of the support and partly by deposition onto the formed support.

Preferably, the tin is introduced into the support, i.e. during the synthesis of the support or during the forming of the support. In the case of an alumina-based support in the form of beads prepared by the oil drop technique, the tin precursor is introduced into the suspension to be dripped.

The phosphorus may be incorporated into the support in any suitable manner, such as coprecipitation, ion exchange or impregnation, and in any step of the process for preparing the catalyst. It may notably be introduced according to the three variants described in the case of tin.

According to one variant, the phosphorus is introduced into the support, i.e. during its forming, for example simultaneously with the tin.

According to another variant, the phosphorus is introduced by impregnation, and particularly preferably it is introduced by impregnation at the same time as the noble metal. In this case, the impregnation solution contains the noble metal precursor and the phosphorus precursor.

The phosphorus precursors may be acids or salts, for example $H_3PO_4$, $H_3PO_3$, $H_3PO_2$, $NH_4H_2PO_4$ or $(NH_4)_2HPO_4$, without this list being exhaustive.

The yttrium may be incorporated into the support in any suitable manner, such as coprecipitation, ion exchange or impregnation, and in any step of the process for preparing the catalyst. It may notably be introduced according to the three variants described in the case of tin. Preferably, it is introduced by impregnation, and particularly preferably it is introduced after the noble metal has been introduced as described below.

The yttrium precursor may be chosen from the group formed by halogenated, hydroxide, carbonate, carboxylate, sulfate, tartrate and nitrate compounds. These yttrium forms may be introduced into the medium for preparing the catalyst in their form as supplied or generated in situ (for example by introduction of yttrium and carboxylic acid). Preferably, yttrium nitrate will be used, for example.

When other promoters are present, they may be incorporated into the support in any suitable manner, such as coprecipitation, ion exchange or impregnation, and in any step of the process for preparing the catalyst. They may notably be introduced according to the three variants described in the case of tin.

When several components of the catalyst are introduced into the support, i.e. during the synthesis of the support or during the forming of the support, the introduction may be simultaneous or may take place separately.

After introduction of the components into the support, the protocol for preparing the catalysts according to the invention generally requires drying and calcination before the deposition of the noble metal and optionally of other components. The drying is generally performed at a temperature of between 50° C. and 250° C., more preferably between 70° C. and 200° C., in air or under an inert atmosphere. The drying is preferentially performed for a time of between 1 and 24 hours, preferably between 1 and 20 hours. The calcination is preferably performed at a temperature of between 350 and 650° C., preferably between 400 and 600° C. and even more preferably between 450 and 550° C., generally in air. The calcination time is generally between 30 minutes and 16 hours, preferably between 1 hour and 5 hours. The temperature increase may be uniform or may include intermediate steady temperature stages, these steady stages being reached with fixed or variable temperature increase rates. These temperature increases may thus be identical or may differ in their rate (in degrees per minute or per hour).

When several components of the catalyst are introduced onto the support formed by impregnation, the introduction of the components may be simultaneous by means of a single impregnation solution or may take place separately by means of several impregnation solutions containing one or more of the components, and may take place in any order.

Any impregnation solution described in the present invention may comprise any polar solvent known to those skilled in the art. Said polar solvent used is advantageously chosen from the group formed by methanol, ethanol, water, phenol and cyclohexanol, taken alone or as a mixture. Said polar solvent may also be advantageously chosen from the group formed by propylene carbonate, DMSO (dimethyl sulfoxide), N-methylpyrrolidone (NMP) and sulfolane, taken alone or as a mixture. Preferably, a polar protic solvent is used. A list of common polar solvents and also their dielectric constant may be found in the book "Solvents and Solvent Effects in Organic Chemistry" C. Reichardt, Wiley-VCH, 3rd edition, 2003, pages 472-474. Very preferably, the solvent used is water or ethanol, and particularly preferably, the solvent is water.

After each impregnation, the impregnated catalyst is generally dried so as to remove all or some of the solvent introduced during the impregnation, preferably at a temperature of between 50° C. and 250° C., more preferably between 70° C. and 200° C. The drying is preferentially performed for a time of between 1 and 24 hours, preferably between 1 and 20 hours. The drying is performed in air, or under an inert atmosphere (for example nitrogen).

After drying, the catalyst is generally calcined, generally in air. The calcination temperature is generally between 350 and 650° C., preferably between 400 and 650° C. and even more preferably between 450 and 550° C. The temperature ramp may optionally contain steady temperature stages.

The calcination time is generally between 30 minutes and 16 hours, preferably between 1 hour and 5 hours.

More particularly, the catalyst according to the invention may be prepared according to a preparation process comprising the following successive steps:
a) a precursor comprising a support, tin, phosphorus and a noble metal is prepared,
b) the precursor obtained in step a) is dried under a stream of a neutral gas or under a stream of a gas containing oxygen at a temperature below 200° C., and is calcined at a temperature between 350 and 650° C.,
c) the dried and calcined precursor obtained in step b) is impregnated with an impregnation solution comprising an yttrium precursor,
d) the impregnated precursor obtained in step c) is dried under a stream of a neutral gas or under a stream of a gas containing oxygen at a temperature below 200° C., and is calcined at a temperature between 350 and 650° C.

It is preferable to introduce the yttrium onto a solid impregnated with the noble metal, notably with platinum, and with phosphorus, which has been dried and calcined beforehand. Specifically, introducing the yttrium after the noble metal and the phosphorus makes it possible to avoid any leaching of the yttrium during the impregnation, preferably in excess, of the noble metal and of the phosphorus.

In step a), a support comprising tin, phosphorus and a noble metal is prepared.

The tin may be introduced at any moment in the preparation of the support, and preferentially during the forming, or by impregnation on an already-formed support. Preferably, the tin is introduced during the forming of the support.

This is likewise the case for the phosphorus. The phosphorus may be introduced at any moment in the preparation of the support, and preferentially during the forming, or by impregnation on an already-formed support. According to one variant, the phosphorus is introduced into the support, i.e. during the forming of the support, preferably with the tin compound. According to another variant, the phosphorus is introduced by impregnation, and particularly preferably it is introduced by impregnation at the same time as the noble metal.

The introduction of the noble metal may advantageously be performed by means of one or more impregnations with an excess of solution onto the support, or by means of one or more dry impregnations, and preferably by a single impregnation in excess of said support (preferably containing the tin compound and optionally the phosphorus), by means of solution(s), preferably aqueous solution(s), containing the noble metal precursor and preferably the phosphorus precursor (when the support does not contain any or contains only part of the phosphorus).

Thus, according to a first variant, step a) comprises the following successive steps:
a1) a support comprising tin is prepared by introducing a tin precursor during the forming of the support,
a2) the support containing tin obtained in step a1) is impregnated with an impregnation solution comprising at least one noble metal precursor and a phosphorus precursor.

According to a second variant, step a) comprises the following successive steps:
a1') a support comprising tin and phosphorus is prepared by introducing a tin precursor and a phosphorus precursor during the forming of the support,
a2') the support containing tin and phosphorus obtained in step a1') is impregnated with an impregnation solution comprising at least one noble metal precursor.

In step b), the precursor obtained in step a) is dried and calcined under the conditions described above.

In step c), the dried and calcined precursor obtained in step b) is impregnated with an impregnation solution comprising at least one yttrium precursor. The introduction of yttrium may be advantageously performed via one or more impregnations with an excess of solution on the support, or preferably via one or more dry impregnations, and, preferably, via only one dry impregnation of said precursor, using solution(s), preferably aqueous solution(s), containing the yttrium precursor.

In step d), the precursor obtained in step c) is dried and calcined under the conditions described above.

According to another variant, the catalyst according to the invention may be prepared by preparing a support comprising tin by introducing the tin precursor during the forming of the support, followed by one or more impregnations with an excess of solution onto the support, or by one or more dry impregnations, and preferably by only one impregnation in excess of said precursor, using solution(s), preferably aqueous solution(s), containing a noble metal precursor, a phosphorus precursor and an yttrium precursor, alone or as a mixture, followed by drying and calcination under the conditions described above.

When the various precursors used in the preparation of the catalyst according to the invention do not contain halogen, or contain an insufficient amount of halogen, it may be necessary to add a halogenated compound during the preparation. Any compound known to those skilled in the art may be used and incorporated into any one of the steps for preparing the catalyst according to the invention. In particular, it is possible to use organic compounds such as methyl or ethyl halides, for example dichloromethane, chloroform, dichloroethane, methylchloroform or carbon tetrachloride.

The halogen may also be added by means of impregnation with an aqueous solution of the corresponding acid, for example hydrochloric acid, at any point in the preparation. A typical protocol consists in impregnating the solid so as to introduce the desired amount of halogen. The catalyst is kept in contact with the aqueous solution for a time that is long enough to deposit this amount of halogen.

The chlorine may also be added to the catalyst according to the invention by means of an oxychlorination treatment. Such a treatment may be performed, for example, between 350 and 550° C. for several hours under a flow of air containing the desired amount of chlorine and optionally containing water.

Before use, the catalyst is subjected to a treatment under hydrogen in order to obtain an active metal phase. The procedure of this treatment consists, for example, of a slow increase of the temperature under a stream of pure or dilute hydrogen, up to the maximum reduction temperature, for example between 100 and 600° C. and preferably between 200 and 580° C., followed by maintenance, for example for 30 minutes to 6 hours at this temperature. This reduction may be performed immediately after the calcination, or later by the user. It is also possible for the user to directly reduce the dried product.

Catalytic Reforming Process

The invention also relates to a process for the catalytic reforming of a hydrocarbon-based feedstock in the presence of the catalyst according to the invention. The catalyst according to the invention may indeed be used in processes for reforming gasolines and for producing aromatic compounds.

The reforming processes make it possible to increase the octane number of the gasoline fractions originating from the distillation of crude oil and/or from other refining processes, for instance catalytic cracking or thermal cracking. The processes for producing aromatics provide the base products (benzene, toluene, xylenes) that can be used in the petrochemical industry. These processes have an additional benefit, contributing to the production of large amounts of hydrogen, essential for refinery hydrotreating and hydrogenation processes.

The feedstock for the reforming processes generally contains paraffinic, naphthenic and aromatic hydrocarbons containing from 5 to 12 carbon atoms per molecule. This feedstock is defined, inter alia, by its density and its weight composition. These feedstocks may have an initial boiling point of between 40° C. and 70° C. and a final boiling point of between 160° C. and 220° C. They may also be formed by a gasoline fraction or a mixture of gasoline fractions having initial and final boiling points of between 40° C. and 220° C. The feedstock may thus also be formed by a heavy naphtha having a boiling point of between 160° C. and 200° C.

Typically, the reforming catalyst is loaded into a unit and subjected first to a reduction treatment as described above.

The feedstock is then introduced in the presence of hydrogen and with a mole ratio of hydrogen/hydrocarbons of the feedstock generally of between 0.1 and 10, preferably between 1 and 8. The operating conditions of the reforming are generally as follows: a temperature preferably between 400° C. and 600° C., more preferably between 450° C. and 540° C., and a pressure preferably between 0.1 MPa and 4 MPa and more preferably between 0.25 MPa and 3.0 MPa. All or some of the hydrogen produced may be recycled to the inlet of the reforming reactor.

EXAMPLES

The examples that follow illustrate the invention.

Example 1: Preparation of a Pt/Al$_2$O$_3$—Sn—Cl Catalyst A1 (Comparative)

A boehmite was synthesized by basification of a 0.1 mol·L$^{-1}$ aluminium nitrate solution with a 1 mol·L$^{-1}$ sodium hydroxide solution at room temperature and with the pH controlled at about 10. The suspension is then matured for one week in an oven at 95° C. without stirring. The pH of the suspension after maturation changes: the final pH is equal to 11.5. The solid is recovered by filtration and then washed in a volume of water approximately equal to the starting volume. The solid is resuspended in water and treated in an autoclave at 150° C. for 4 hours. The suspension is centrifuged and then dried under a stream of air, at room temperature.

The support of Example 1 is prepared using the boehmite thus synthesized. A suspension containing 25% of mineral material (expressed as percentage of Al$_2$O$_3$) is prepared by mixing a γ-alumina feed and the boehmite powder in an acidified aqueous solution containing 15% by mass of HNO$_3$/Al$_2$O$_3$. Tin dichloride is added to this suspension so as to obtain 0.3% by weight of tin on the final solid. The solid fraction of Al$_2$O$_3$ is provided to a proportion of 88% by weight by the boehmite and to a proportion of 12% by the γ-alumina feed. This suspension also contains a pore-forming agent and a surfactant. The pore-forming agent is an organic phase comprising a mixture of paraffins containing between 10 and 12 carbon atoms, the boiling point of which is about 290° C. and the density of which is 0.75 g/cm$^3$. The surfactant is Galoryl™. These compounds are introduced in the following proportions: mass fraction of pore-forming agent/water=1.4% and mass fraction of surfactant/pore-forming agent=6%.

The system is subjected to stirring at 600 rpm until a suspension having rheological properties suitable for being dropped is obtained (viscosity 250 MPa·s).

Forming by oil dropping is performed. The dropping column is filled with an ammoniacal solution at a concentration of 28 g/L and an organic solution consisting of the same petroleum cut as that used as pore-forming agent in the preparation of the emulsion. The suspension is dropped by means of calibrated nozzles. The beads are collected at the bottom of the column and placed in a ventilated oven at 120° C. in wet air containing 200 g of water/kg of dry air for 12 hours. They are then calcined in dry air at 650° C. for 3 hours. The beads obtained have a diameter of 1.9 mm.

A catalyst A1 is prepared on this support, targeting a deposit of 0.3% by weight of platinum and 1% by weight of chlorine on the final catalyst. 400 cm$^3$ of an aqueous solution of hexachloroplatinic acid and of hydrochloric acid are added to 100 g of alumina support containing tin. The support is left in contact with the solution for 4 hours and is then drained. It is dried at 120° C. for 15 hours and then calcined at 500° C. under a stream of air of 100 litres per hour for 3 hours, with a temperature increase rate of 7° C. per minute.

The chlorine content greater than 1% by weight after calcination is adjusted to 1% by weight by means of a partial dechlorination heat treatment at 520° C. in dry air supplemented with 8000 ppm by volume of water, for 2.5 hours.

Catalyst A1 obtained after dechlorination contains 0.29% by weight of platinum, 0.29% by weight of tin and 1.03% by weight of chlorine.

Example 2: Preparation of a Catalyst A2: Pt/Al$_2$O$_3$—Sn—P—Cl (Comparative)

A boehmite was synthesized by basification of a 0.1 mol·L$^{-1}$ aluminium nitrate solution with a 1 mol·L$^{-1}$ sodium hydroxide solution at room temperature and with the pH controlled at about 10. The suspension is then matured for one week in an oven at 95° C. without stirring. The pH of the suspension after maturation changes: the final pH is equal to 11.5. The solid is recovered by filtration and then washed in a volume of water approximately equal to the starting volume. The solid is resuspended in water and treated in an autoclave at 150° C. for 4 hours. The suspension is centrifuged and then dried under a stream of air, at room temperature.

The support of Example 2 is prepared using the boehmite thus synthesized. A suspension containing 25% of mineral material (expressed as percentage of Al$_2$O$_3$) is prepared by mixing a γ-alumina feed and the boehmite powder in an acidified aqueous solution containing 15% by mass of HNO$_3$/Al$_2$O$_3$. Tin dichloride and phosphoric acid are simultaneously added to this suspension so as to obtain 0.3% by weight of tin and 0.4% by weight of phosphorus on the final solid. The solid fraction of $Al_2O_3$ is provided to a proportion of 88% by weight by the boehmite and to a proportion of 12% by the γ-alumina feed. This suspension also contains a pore-forming agent and a surfactant. The pore-forming agent is an organic phase comprising a mixture of paraffins containing between 10 and 12 carbon atoms, the boiling point of which is about 290° C. and the density of which is 0.75 g/cm³. The surfactant is Galoryl™. These compounds are introduced in the following proportions: mass fraction of pore-forming agent/water=1.4% and mass fraction of surfactant/pore-forming agent=6%.

The system is subjected to stirring at 600 rpm until a suspension having rheological properties suitable for being dropped is obtained (viscosity 250 MPa·s).

Forming by oil dropping is performed. The dropping column is filled with an ammoniacal solution at a concentration of 28 g/L and an organic solution consisting of the same petroleum cut as that used as pore-forming agent in the preparation of the emulsion. The suspension is dropped by means of calibrated nozzles. The beads are collected at the bottom of the column and placed in a ventilated oven at 120° C. in wet air containing 200 g of water/kg of dry air for 12 hours. They are then calcined in dry air at 650° C. for 3 hours. The beads obtained have a diameter of 1.9 mm.

A catalyst A is prepared on this support, targeting a deposit of 0.3% by weight of platinum and 1% by weight of chlorine on the final catalyst. 400 cm³ of an aqueous solution of hexachloroplatinic acid and of hydrochloric acid are added to 100 g of alumina support containing tin. The support is left in contact with the solution for 4 hours and is then drained. It is dried at 120° C. for 15 hours and then calcined at 500° C. under a stream of air of 100 litres per hour for 3 hours, with a temperature increase rate of 7° C. per minute. The chlorine content greater than 1% by weight after calcination is adjusted to 1% by weight by means of a partial dechlorination heat treatment at 520° C. in dry air supplemented with 8000 ppm by volume of water, for 2.5 hours.

Catalyst A obtained after dechlorination contains 0.29% by weight of platinum, 0.28% by weight of tin, 0.40% by weight of phosphorus and 1.01% by weight of chlorine.

Example 3: Preparation of a Catalyst B: YPt/ $Al_2O_3$—Sn—Cl (Comparative)

The support of Example 3 is prepared in a similar manner to that of Example 2, except that only tin dichloride is added to the boehmite suspension, to target 0.3% by weight of tin in the final solid.

Impregnation with an excess of platinum is performed on this support, targeting a deposit of 0.3% by weight of platinum and 1% by weight of chlorine on the final catalyst, in the same manner as described in Example 2.

After calcination, dry impregnation of yttrium nitrate is performed to target 0.09% by weight on the final catalyst. Before impregnation of the Y, the catalyst is left in a water-saturated atmosphere overnight at room temperature. 42 cm³ of an aqueous solution of yttrium nitrate are added to 70 g of alumina support containing tin. The support is left in contact with the solution for 30 minutes. After impregnation, the solid is left again overnight to mature at room temperature in a water-saturated atmosphere. It is dried at 120° C. for 15 hours and then calcined at 500° C. under a stream of air of 100 litres per hour for 3 hours, with a temperature increase rate of 7° C. per minute. Adjustment of the chlorine content is performed as described in Example 2, for 2 hours.

Catalyst B obtained after dechlorination contains 0.29% by weight of platinum, 0.31% by weight of tin, 0.09% by weight of yttrium and 1.00% by weight of chlorine.

Example 4: Preparation of a Catalyst C: YPt/ $Al_2O_3$—Sn—$P_{0.4}$—Cl (According to the Invention)

A catalyst C is prepared from the support of Example 2 containing 0.3% by weight of tin and 0.4% by weight of phosphorus, by impregnation of platinum and then of yttrium as described in Example 3.

Catalyst C obtained after dechlorination contains 0.32% by weight of platinum, 0.08% by weight of yttrium, 0.29% by weight of tin, 0.419% by weight of phosphorus and 1.04% by weight of chlorine.

Example 5: Preparation of a Catalyst D: YPt/ $Al_2O_3$—Sn—$P_{0.8}$—Cl (According to the Invention)

The support of Example 5 is prepared in a similar manner to that of Example 2, except that the target phosphorus content is 0.8% by weight on the final catalyst.

Platinum and then yttrium are subsequently impregnated as described in Example 2.

Catalyst D obtained after dechlorination contains 0.29% by weight of platinum, 0.08% by weight of yttrium, 0.29% by weight of tin, 0.76% by weight of phosphorus and 1.01% by weight of chlorine.

Example 6: Preparation of a Catalyst E: PtY/ $Al_2O_3$—Sn—$P_{0.4}$—Cl (According to the Invention)

A catalyst E is prepared from the support of Example 2 containing 0.3% by weight of tin and 0.4% by weight of phosphorus, by impregnation of yttrium and then of platinum, which differs from Example 3 in the order of introduction by impregnation of the elements. The target contents of 0.08% by weight of yttrium and 0.30% by weight of platinum are identical.

Catalyst E obtained after dechlorination contains 0.31% by weight of platinum, 0.07% by weight of yttrium, 0.30% by weight of tin, 0.38% by weight of phosphorus and 0.98% by weight of chlorine.

Example 7: Preparation of a Catalyst F: YPt/ $Al_2O_3$—Sn—$P_{0.3}$—Cl (According to the Invention)

The support of Example 7 is prepared in a similar manner to that of Example 2, except that the target phosphorus content is 0.3% by weight on the final catalyst.

Platinum and then yttrium are subsequently impregnated as described in Example 3.

Catalyst F obtained after dechlorination contains 0.29% by weight of platinum, 0.07% by weight of yttrium, 0.31% by weight of tin, 0.31% by weight of phosphorus and 1.04% by weight of chlorine.

Example 8: Preparation of a Catalyst G: YPt/ $Al_2O_3$—Sn—$P_{1.15}$—Cl (Comparative)

The support of Example 8 is prepared in a similar manner to that of Example 2, except that the target phosphorus content is 1.15% by weight on the final catalyst.

Platinum and then yttrium are subsequently impregnated as described in Example 2.

Catalyst G obtained after dechlorination contains 0.30% by weight of platinum, 0.08% by weight of yttrium, 0.31% by weight of tin, 1.17% by weight of phosphorus and 0.97% by weight of chlorine.

Example 9: Preparation of a Catalyst H: YPt/ $Al_2O_3$—Sn—$P_{0.4}$—Cl (According to the Invention)

A catalyst H is prepared from the support of Example 2 containing 0.3% by weight of tin and 0.4% by weight of phosphorus, by impregnation of platinum and then of yttrium as described in Example 3, the difference being that the target yttrium content is 0.50% by weight.

Catalyst H obtained after dechlorination contains 0.30% by weight of platinum, 0.48% by weight of yttrium, 0.30% by weight of tin, 0.39% by weight of phosphorus and 1.01% by weight of chlorine.

Example 10: Preparation of a Catalyst I: $YPtP_{0.4}$/ $Al_2O_3$—Sn—Cl (According to the Invention)

The support of Example 3 is prepared in a similar manner to that of Example 2, except that only tin dichloride is added to the boehmite suspension, to target 0.3% by weight in the final solid.

Impregnation with an excess of platinum is performed according to Example 2, except that phosphoric acid is added to the hexachloroplatinic acid solution so as to target a content of 0.4% by weight on the final catalyst. The dry impregnation of yttrium is performed according to the procedure described in Example 3. The heat treatments are identical to those of Example 3.

Catalyst I obtained after dechlorination contains 0.291% by weight of platinum, 0.08% by weight of yttrium, 0.31% by weight of tin, 0.38% by weight of phosphorus and 1.03% by weight of chlorine.

Example 11: Preparation of a Catalyst J: $YPtP_{0.4}$/ $Al_2O_3$—Sn—Cl (Comparative)

Catalyst J is prepared exactly like catalyst H, but with a different target content of Y (higher) of the order of 1.2% by weight. Catalyst J obtained after dechlorination contains 0.29% by weight of platinum, 1.17% by weight of yttrium, 0.29% by weight of tin, 0.38% by weight of phosphorus and 0.98% by weight of chlorine.

Example 12: Evaluation of the Performance of Catalysts A1, A2 and B to J in Catalytic Reforming Samples of the catalysts whose preparations are described in Examples 1 to 11 were used in a reaction bed adapted to the conversion of a hydrocarbon-based feedstock, of naphtha type obtained from oil distillation. This naphtha has the following composition:

49.6% by weight of paraffinic compounds, 35.3% by weight of naphthenes, 15.1% by weight of aromatic compounds.

For a total density of 0.7539 g/cm³. The initial and final distillation points of this feedstock are 101 and 175° C., respectively, with 95% of the distillation performed at 166° C.

The research octane number is close to 55.

After loading into the reactor, the catalysts are activated by heat treatment under an atmosphere of pure hydrogen, for a time of 2 hours at 490° C.

Evaluation of the catalytic performance is performed under reforming reaction conditions, in the presence of hydrogen and naphtha described above. The conditions for the implementation of the catalyst are as follows:

Pressure of the reactor: 0.76 MPa (7.6 barg)

Feedstock flow rate of 1.8 kg/hour per kg of catalyst

Hydrogen/feedstock hydrocarbons mole ratio: 3

The comparison of the catalysts is performed at an equivalent quality of research octane number (RON) of the liquid effluents (reformates) resulting from the catalytic conversion of the feedstock. The comparison is performed for a RON of 100.

The selectivity is expressed as yield of $C_{5+}$ compounds expressed as a mass percentage relative to the effluent at a given level of activity. During the test, the yield passes through a first phase during which it increases with the time under feedstock which corresponds to the selectivation of the catalyst by the coke. Next, after a steady stage of variable duration, the yield values decrease with time. This is the period of deactivation of the catalyst. The comparisons of catalysts in terms of selectivity will be made here using the yield values measured over the steady stages. The accuracy of this measurement is ±0.3 point. A selective catalyst is expressed by a high C5+ yield. The activity is expressed by a temperature required to reach a given octane number (also known as the RON or Research Octane Number). Here, the temperature will be taken at 24 hours of testing. The accuracy of this measurement is ±2° C. A very active catalyst is expressed by a relatively low temperature to reach the RON.

The term "stability" means the stability of the activity which is generally measured by the thermal increment applied per unit of time to maintain a constant RON of 100. A stable catalyst is expressed by a low thermal increment.

| Catalyst | | Yield C5+ (weight %) | Temperature at 24 hours (° C.) | Thermal increment over 240 hours (° C./h) |
|---|---|---|---|---|
| A1 | $Pt/Al_2O_3$—Sn—Cl | 86.8 | 475 | 0.17 |
| A2 | $Pt/Al_2O_3$—Sn—$P_{0.4}$—Cl | 88.4 | 481 | 0.12 |
| B | $Y_{0.1}Pt/Al_2O_3$—Sn—Cl | 88.6 | 478 | 0.10 |
| C | $Y_{0.1}Pt/Al_2O_3$—Sn—$P_{0.4}$—Cl | 89.0 | 481 | 0.08 |
| D | $Y_{0.1}Pt/Al_2O_3$—Sn—$P_{0.8}$—Cl | 89.2 | 484 | 0.07 |
| E | $PtY_{0.1}/Al_2O_3$—Sn—$P_{0.4}$—Cl | 89.0 | 482 | 0.08 |
| F | $Y_{0.1}Pt/Al_2O_3$—Sn—$P_{0.3}$—Cl | 88.7 | 480 | 0.10 |
| G | $Y_{0.1}Pt/Al_2O_3$—Sn—$P_{1.15}$—C | 88.9 | 486 | 0.06 |
| H | $Y_{0.5}Pt/Al_2O_3$—Sn—$P_{0.4}$—Cl | 88.8 | 485 | 0.09 |
| I | $Y_{0.1}PtP_{0.4}/Al_2O_3$—Sn—Cl | 89.6 | 480 | 0.07 |
| J | $Y_{1.2}Pt/Al_2O_3$—Sn—$P_{0.4}$—Cl | 88.7 | 489 | 0.13 |

These results show a synergistic effect between P and Y when the phosphorus content is less than or equal to 1% by weight and the yttrium content is less than or equal to 1% by weight of yttrium. This effect makes it possible to improve the selectivity and the stability of the catalysts without degrading their activity.

The invention claimed is:

1. Catalyst comprising:
   a support,
   at least one noble metal M, tin, and phosphorus, and
   only one metallic promoter wherein the metallic promoter is yttrium,
   wherein the phosphorus content is between 0.3% and 1% by weight relative to the mass of the catalyst,
   and wherein the yttrium content is between 0.01% and 0.5% by weight relative to the mass of the catalyst.

2. The catalyst according to claim 1, wherein the content of noble metal M is between 0.02% and 2% by weight relative to the mass of the catalyst.

3. The catalyst according to claim 1, wherein the metal M is platinum or palladium.

4. The catalyst according to claim 1, wherein the tin content is between 0.005% and 10% by weight relative to the mass of the catalyst.

5. The catalyst according to claim 1, wherein the yttrium content is between 0.01% and 0.5% by weight relative to the mass of the catalyst.

6. The catalyst according to claim 1, wherein the Sn/M atomic ratio is between 0.5 and 4.0, the P/M ratio is between 0.2 and 30.0 and the Y/M ratio is between 0.1 and 5.0.

7. The catalyst according to claim 1, wherein the support comprises silica, alumina or silica-alumina.

8. The catalyst according to claim 1, additionally comprising a halogenated compound.

9. The catalyst according to claim 8, wherein the content of halogenated compound is between 0.1% and 8% by weight relative to the mass of the catalyst.

10. The catalyst according to claim 1, wherein the yttrium content is between 0.07 to 0.48% by weight relative to the mass of the catalyst.

11. The catalyst according to claim 1, wherein the phosphorous content is between 0.3 to 0.8%, by weight relative to the mass of the catalyst.

12. The catalyst according to claim 1, wherein the phosphorous content is between 0.3 to 0.8%, by weight relative to the mass of the catalyst.

13. The catalyst according to claim 1, wherein the phosphorous content is between 0.4 to 0.8%, by weight relative to the mass of the catalyst.

14. The catalyst according to claim 1, wherein the wherein the yttrium content is between 0.01% and 0.5%, by weight relative to the mass of the catalyst.

15. The catalyst according to claim 1, wherein
   the phosphorus content is between 0.4% and 0.8% by weight relative to the mass of the catalyst,
   the yttrium content is between 0.01% and 0.5%, by weight relative to the mass of the catalyst,
   the tin content is between 0.01% and 1% by weight relative to the mass of the catalyst,
   and wherein the noble metal is platinum and the platinum content is between 0.1% and 0.8%.

16. The catalyst according to claim 1, wherein the catalyst consists of
   a support,
   at least one noble metal M, tin, and phosphorus,
   only one metallic promoter wherein the metallic promoter is yttrium, and
   a halogenated compound
   wherein the tin content is between 0.005% and 10% by weight relative to the mass of the catalyst,
   wherein the phosphorus content is between 0.3% and 1% by weight relative to the mass of the catalyst, and
   wherein the yttrium content is between 0.01% and 0.5% by weight relative to the mass of the catalyst.

17. The catalyst of claim 1 wherein the catalyst is prepared by a process comprising the following successive steps:
   a) a precursor comprising a support, tin, phosphorus and the noble metal is prepared,
   b) the precursor obtained in step a) is dried under a stream of a neutral gas or under a stream of a gas containing oxygen at a temperature below 200° C., and is calcined at a temperature between 350 and 650° C.,
   c) the dried and calcined precursor obtained in step b) is impregnated with an impregnation solution comprising an yttrium precursor,
   d) the impregnated precursor obtained in step c) is dried under a stream of a neutral gas or under a stream of a gas containing oxygen at a temperature below 200° C., and is calcined at a temperature between 350 and 650° C.

18. A catalyst comprising:
   a support,
   at least one noble metal M, tin, and phosphorus, and
   only one metallic promoter wherein the metallic promoter is yttrium,
   the phosphorus content being between 0.3% and 1.15% by weight relative to the mass of the catalyst,
   the yttrium content being less than or equal to 1% by weight relative to the mass of the catalyst and
   wherein the catalyst has a thermal increment applied per unit of time to maintain a constant research octane number of 100 wherein the thermal increment over 240 hours is equal to or less than 0.10 (° C./h).

* * * * *